R. H. HURLBUT.
LATHE CHUCK.
APPLICATION FILED JULY 16, 1909.

948,449.

Patented Feb. 8, 1910.

WITNESSES:
William H. Darling
S. W. Moore

INVENTOR.
Rufus H. Hurlbut
BY
Stephen Moore
ATTORNEY.

UNITED STATES PATENT OFFICE.

RUFUS H. HURLBUT, OF SUDBURY, MASSACHUSETTS.

LATHE-CHUCK.

948,449.  Specification of Letters Patent.  Patented Feb. 8, 1910.

Application filed July 16, 1909. Serial No. 507,927.

*To all whom it may concern:*

Be it known that I, RUFUS H. HURLBUT, a citizen of the United States, and a resident of Sudbury, in the county of Middlesex and State of Massachusetts, have invented certain new and useful Improvements in Lathe-Chucks, of which the following is a specification.

My invention relates to an improvement in chucks for use on lathes, screw machines and others having a hollow spindle for the introduction of the stock in the form of rods, tubes or bars, and consists in the equipment of the radially movable jaws of a chuck with gripping devices actuated by a mechanism independent of that moving the main jaws and operatable while the chuck is revolving.

The object of my invention is to provide a simple and efficient device with large adjustment for size of stock for quickly gripping and releasing the stock while the chuck is revolving. I attain this object by the mechanism shown in the accompanying drawings in which—

Figure 1:
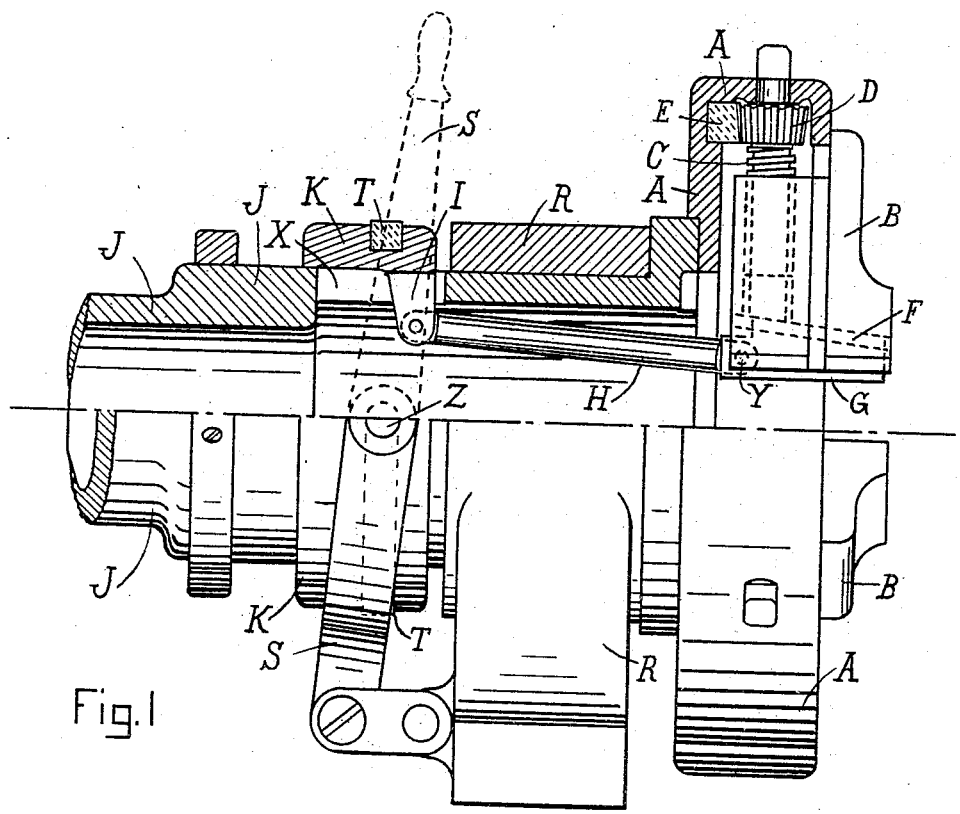
Figure 2:
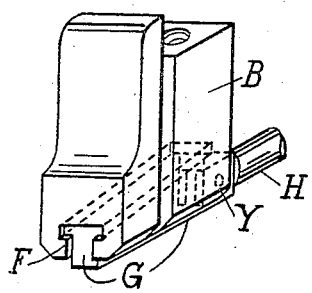

Figure 1 is a longitudinal view of a chuck and the front end of a spindle, half in elevation and half in section. Fig. 2 shows one jaw disconnected from the other parts.

Similar letters refer to similar parts in all the views.

In Fig. 1, the letter A designates the body of the chuck. This chuck may be of any convenient style or number of jaws, and may have its jaws operated by any suitable mechanism, but I prefer as is here shown a three jaw universal chuck.

The letter B designates one of the jaws which is movable radially by the screw C carrying the pinion-gear D in gear with the circular rack E in the usual manner. The other jaws are similarly connected to the same rack E. The inner ends of the jaws B have T-shaped slots as at F, see Fig. 2, with the sides parallel to the axis of the spindle J but with the bottom making a small angle with the said spindle and in the slots F slide the wedge-shaped gripping pieces G. These wedge members G are each connected by pivots Y to one end of the links H which extend back inside the bore of the spindle J, and have their other ends pivotally connected to the lugs I of the collar K, said lugs I projecting inward through the openings X in the spindle J. The collar K, located behind the head bearing R, is movable longitudinally on the spindle J by the stationary ring T which rides in a groove in the said collar K and is pivotally connected at Z to the lever handle S.

The method of operating the chuck is as follows:—With the chuck stationary, the jaws are adjusted by a wrench on the head of a pinion screw C so that the stock just passes freely when the wedges G are drawn back. When the desired length of stock has been advanced beyond the chuck, the lever handle S is moved toward the chuck, thus advancing the collar K, the links H and the wedges G the lower surfaces of which approach the axis of the spindle J and finally grip the stock. The stock may now be released and gripped by opposite motions of the handle S, while the chuck and spindle are revolving.

I claim:—

1. In a chuck, the combination of jaws movable radially, suitable mechanism for operating the same, gripping devices carried on the inner ends of one or more of said jaws, and means for operating said gripping devices independently of mechanism actuating the main jaws.

2. In a chuck, the combination of jaws movable radially, suitable mechanism for operating the same, gripping devices carried on the inner ends of one or more of said jaws, and means independent of the mechanism operating the said jaws for actuating the said gripping devices while the chuck is revolving.

3. In a universal chuck, the combination with the main jaws, of supplementary gripping jaws on the inner ends of said main jaws, and means for operating said gripping jaws without stopping the rotation of the chuck, independently of mechanism moving the main jaws.

4. In a chuck with jaws movable radially, the combination with the said jaws, of gripping wedge-shaped members carried on the inner ends of said jaws, and means for operating said wedge-shaped members without moving the main jaws.

5. In a chuck, the combination of jaws movable radially, suitable mechanism for operating the same, wedge-shaped supplementary jaws carried on the inner ends of said main jaws, and mechanism for causing a lateral movement of said wedge jaws parallel to the axis of the spindle without moving the main jaws, substantially as shown and described.

6. In a chuck with jaws movable radially, the combination with the said jaws, of wedge-shaped supplementary members sliding in slots in the inner ends of the main jaws, the bottoms of which slots make a small angle with the axis of the spindle, links in the bore of the spindle having one end connected to each of said wedge members, a loose collar encircling the spindle a short distance behind the chuck and movable longitudinally on the said spindle, said collar having lugs projecting inward through openings in said spindle and pivotally connected to the other ends of the aforesaid links, and means for reciprocating said collar on said spindle, substantially as set forth.

In testimony whereof I have affixed my signature, in presence of two witnesses.

RUFUS H. HURLBUT.

Witnesses:
RALPH L. RICHARDSON,
LLEWELLYN C. RICHARDSON.